US009378900B2

(12) United States Patent
Dumas et al.

(10) Patent No.: US 9,378,900 B2
(45) Date of Patent: Jun. 28, 2016

(54) SOLID ELECTROCHEMICAL SUPERCAPACITOR

(71) Applicant: Her Majesty the Queen in Right of Canada, as represented by the Minister of National Defence, Ottawa (CA)

(72) Inventors: Jean Dumas, Pintendre (CA); Daniel Belanger, St-Hubert (CA); Tarik Bordjiba, Guelma (DZ)

(73) Assignee: HER MAJESTY THE QUEEN IN RIGHT OF CANADA, REPRESENTED BY THE MINISTER OF NATIONAL DEFENCE, Ottawa (CA)

( * ) Notice: Subject to any disclaimer, the term of this patent is extended or adjusted under 35 U.S.C. 154(b) by 244 days.

(21) Appl. No.: 13/935,867

(22) Filed: Jul. 5, 2013

(65) Prior Publication Data
US 2015/0009605 A1    Jan. 8, 2015

(51) Int. Cl.
*H01G 9/00* (2006.01)
*H01G 11/36* (2013.01)
*H01G 11/86* (2013.01)
*H01G 11/26* (2013.01)
*H01G 11/46* (2013.01)

(52) U.S. Cl.
CPC ............... *H01G 11/36* (2013.01); *H01G 11/26* (2013.01); *H01G 11/46* (2013.01); *H01G 11/86* (2013.01); *Y02E 60/13* (2013.01); *Y10T 156/10* (2015.01)

(58) Field of Classification Search
None
See application file for complete search history.

(56) References Cited

U.S. PATENT DOCUMENTS

| 7,776,444 B2 | 8/2010 | Rinzler et al. | |
| 2010/0035093 A1* | 2/2010 | Ruoff | H01G 11/36 429/493 |

OTHER PUBLICATIONS

Amitha et al., "A non-aqueous electrolyte-based asymmetric supercapacitor with polymer and metal oxide/multiwalled carbon nanotube electrodes", J. Nanopart. Res., 11:725-729 (2009).
Reddy et al., "Asymmetric Flexible Supercapacitor Stack", Nanoscale Res. Lett., 3:145-151 (2008).

* cited by examiner

*Primary Examiner* — Seahvosh Nikmanesh
(74) *Attorney, Agent, or Firm* — Benoit & Cote Inc.

(57) ABSTRACT

A process for fabricating an electrochemical supercapacitor is disclosed herein. The process comprises depositing a carbon nanotube layer onto a first substrate; depositing a layer of metal oxide material onto the substrate forming a first electrode; depositing an electrolytic material onto the electrode; and joining the electrode to a first face of a solid electrolyte membrane such that the electrolytic material is disposed between the electrode and the electrolytic membrane. The carbon nanotubes, the metal oxide and the electrolytic material comprise distinct layers. An electrochemical supercapacitor fabricated by the above-referenced process is also disclosed.

14 Claims, 2 Drawing Sheets

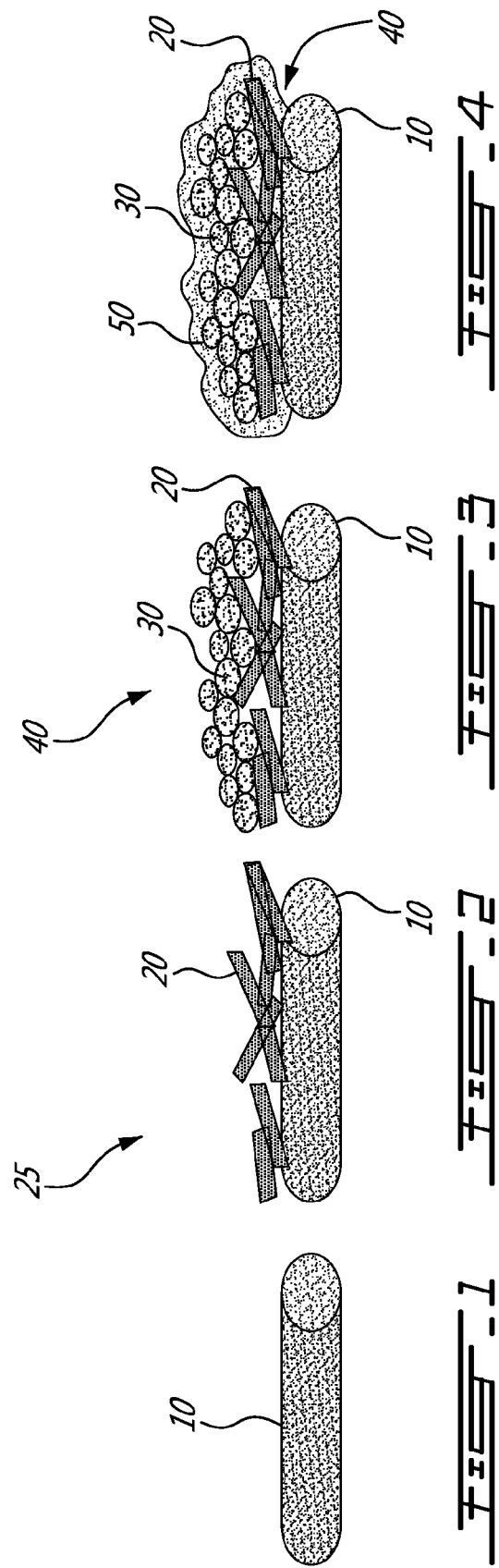

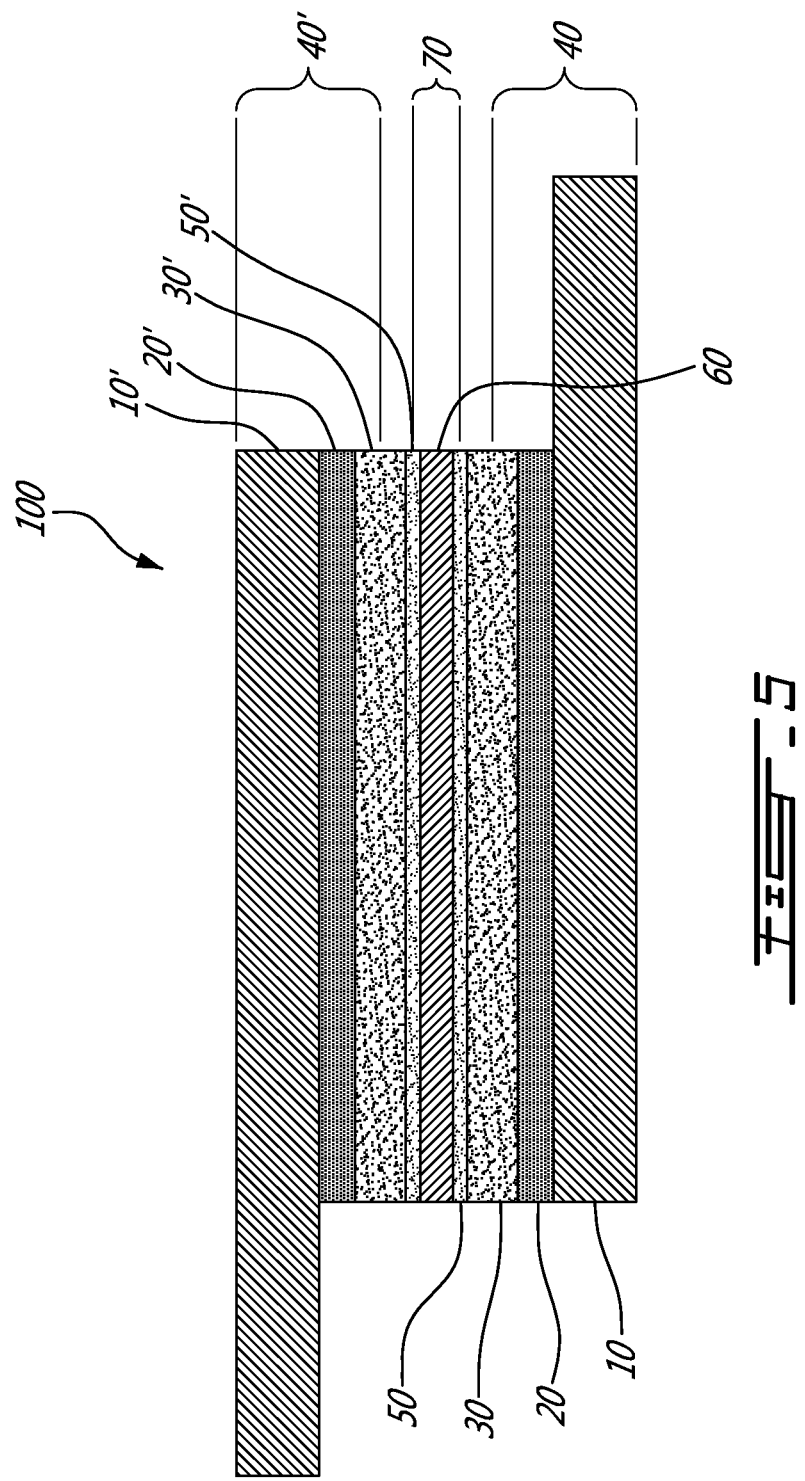

SOLID ELECTROCHEMICAL SUPERCAPACITOR

FIELD

The present disclosure broadly relates to electrochemical supercapacitors. More specifically, but not exclusively, the present disclosure relates to solid electrochemical supercapacitors and to a process for fabricating the supercapacitors using sequential depositing of materials.

BACKGROUND

Electrochemical supercapacitors provide a mechanism for storage of electrical energy. A supercapacitor is typically formed of two electrodes separated by an electrolyte layer.

Amitha et al. (J. Nanopart. Res. (2009) 11:725-729) disclose a supercapacitor using non-aqueous electrolyte and multiwalled carbon nanotube (MWNTs) nanocomposite electrodes. The electrodes were designed with polymer and metal oxide loaded carbon nanotubes. More specifically, $TiO_2$ functionalized nanotubes were obtained by coating $TiO_2$ over the MWNTs using a sol-gel process. The nanocomposites were then coated onto carbon paper using a Nafion solution to obtain flexible electrodes. The carbon paper with the nanocomposite coating was subsequently pressed to both sides of a Nafion membrane, which acts both as a separator and as an electrolyte. Since the $TiO_2$/MWNT nanocomposite is prepared by dispersion, one can assume that there is no distinct metal oxide layer.

Reddy et al. (Nanoscale Res. Lett. (2008) 3:145-151) disclose an asymmetric double supercapacitor stack fabricated using polymer/MWNTs and metal oxide/MWNTs coated over a flexible carbon fabric as electrodes and a Nafion™ membrane as a solid electrolyte. The MWNTs were prepared by thermal chemical vapor deposition (CVD) and the metal oxide functionalized nanotubes were obtained using a sol-gel process. Since the MWNT-based nanocomposite is prepared by dispersion, one can assume that there is no distinct layer of active electrode material.

The present disclosure refers to a number of documents, the contents of which are herein incorporated by reference in their entirety.

SUMMARY

The following introduction is provided to introduce the reader to the more detailed discussion to follow. The introduction is not intended to limit or define the claims.

The present disclosure broadly relates to solid electrochemical supercapacitors comprising a sequentially layered configuration and to a process for fabricating the electrochemical supercapacitors.

In an embodiment, the present disclosure relates to a process for fabricating an electrochemical supercapacitor, the process comprising: depositing carbon nanotubes onto a surface of a substrate; depositing a metal oxide material onto the carbon nanotubes forming a first electrode; depositing an electrolytic material onto the electrode; joining the first electrode to a first face of a solid electrolyte membrane; and joining a second electrode of similar or different configuration as the first electrode to a second face of the solid electrolyte membrane forming the electrochemical supercapacitor. In a further embodiment of the present disclosure, the electrochemical supercapacitor comprises a solid electrolyte composed of a solid electrolyte membrane disposed between layers of an electrolytic material.

In a further embodiment of the present disclosure, the carbon nanotubes are deposited onto the substrate by vacuum filtration; and the metal oxide material is deposited onto the carbon nanotube layer by vacuum filtration. In a further embodiment of the present disclosure, a portion of the electrolytic material diffuses into the metal oxide layer. In a further embodiment of the present disclosure, a portion of the electrolytic material diffuses into the metal oxide and carbon nanotube layers. In yet a further embodiment of the present disclosure, the substrate comprises carbon paper and the electrolytic material and electrolyte membrane comprise an ion exchange material.

In an embodiment, the present disclosure relates to an electrochemical supercapacitor comprising a solid electrolyte membrane, a first electrode and an electrolytic material. The first electrode is joined to a first face of the solid electrolyte membrane and is composed of a substrate onto which is deposited a layer of carbon nanotubes and a layer of a metal oxide material. The electrolytic material is deposited onto the first electrode forming a discrete layer disposed between the electrode and the solid electrolyte membrane.

In an embodiment, the present disclosure relates to an electrochemical supercapacitor comprising: a solid electrolyte membrane; a first electrode operatively connected to a first face of the solid electrolyte membrane through a layer of an electrolytic material; a second electrode operatively connected to a second face of the solid electrolyte membrane through a layer of an electrolytic material; wherein the first and second electrodes comprise a substrate, a carbon-nanotube layer and a metal oxide layer, the layers having been deposited by vacuum filtration.

In an embodiment, the present disclosure relates to an electrochemical supercapacitor comprising a solid electrolyte disposed between a pair of electrodes. In a further embodiment of the present disclosure, the solid electrolyte comprises a solid electrolyte membrane disposed between layers of an electrolytic material.

The foregoing and other objects, advantages and features of the present disclosure will become more apparent upon reading of the following non-restrictive description of illustrative embodiments thereof, given by way of example only with reference to the accompanying drawings/figures.

BRIEF DESCRIPTION OF THE DRAWINGS/FIGURES

For a better understanding of the embodiments described herein and to illustrate more clearly how they may be carried into effect, reference will now be made, by way of example only, to the accompanying drawings which show at least one exemplary embodiment, and in which:

FIG. 1 is a schematic diagram of a substrate according to an exemplary process for fabricating a solid electrochemical supercapacitor;

FIG. 2 is a schematic diagram of a substrate comprising carbon nanotubes deposited thereon, according to an exemplary process for fabricating a solid electrochemical supercapacitor;

FIG. 3 is a schematic diagram of an electrode, according to an exemplary process for fabricating a solid electrochemical supercapacitor;

FIG. 4 is a schematic diagram of an electrode comprising an electrolytic material layer deposited thereon, according to an exemplary process for fabricating a solid electrochemical supercapacitor; and FIG. 5 is an elevated sectional view of a supercapacitor according to an exemplary embodiment of the present disclosure.

DETAILED DESCRIPTION

I. Definitions

In order to provide a clear and consistent understanding of the terms used in the present specification, a number of definitions are provided below. Moreover, unless defined otherwise, all technical and scientific terms as used herein have the same meaning as commonly understood by one of ordinary skill in the art to which this specification pertains.

Unless otherwise indicated, the definitions and embodiments described in this and other sections are intended to be applicable to all embodiments and aspects of the application herein described for which they are suitable as would be understood by a person skilled in the art.

The word "a" or "an" when used in conjunction with the term "comprising" in the claims and/or the specification may mean "one", but it is also consistent with the meaning of "one or more", "at least one", and "one or more than one". Similarly, the word "another" may mean at least a second or more.

As used in this specification and claim(s), the words "comprising" (and any form of comprising, such as "comprise" and "comprises"), "having" (and any form of having, such as "have" and "has"), "including" (and any form of including, such as "include" and "includes") or "containing" (and any form of containing, such as "contain" and "contains"), are inclusive or open-ended and do not exclude additional, unrecited elements or process steps.

As used in this specification and claim(s), the word "consisting" and its derivatives, are intended to be close ended terms that specify the presence of stated features, elements, components, groups, integers, and/or steps, and also exclude the presence of other unstated features, elements, components, groups, integers and/or steps.

The terms "about", "substantially" and "approximately" as used herein mean a reasonable amount of deviation of the modified term such that the end result is not significantly changed. These terms of degree should be construed as including a deviation of at least ±1% of the modified term if this deviation would not negate the meaning of the word it modifies.

The term "discrete" as used herein means distinct or clearly distinguishable.

It will be appreciated that, for simplicity and clarity of illustration, where considered appropriate, reference numerals may be repeated among the figures to indicate corresponding or analogous elements or steps. In addition, numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way but rather as merely describing the implementation of the various embodiments described herein.

According to various exemplary embodiments of a process for fabricating the solid electrochemical supercapacitor, and with reference to FIG. 1, a suitable substrate 10 is provided. In a particular embodiment of the present disclosure, a suitable substrate 10 can be a sheet of carbon paper (e.g. Spectracarb™). In a further embodiment of the present disclosure, the carbon paper may be treated, such as by acid treatment. In accordance with an exemplary embodiment of the present disclosure, the carbon paper is immersed in a bath of concentrated sulfuric acid and then repeatedly washed with distilled water and subsequently dried.

In accordance with the process for fabricating the electrochemical supercapacitor, a layer of carbon nanotubes 20 is subsequently deposited onto substrate 10. In a particular embodiment of the present disclosure, the carbon nanotubes are composed of one or more one-atom thick layers of graphite, called graphene sheets. In a particular embodiment of the present disclosure, the carbon nanotubes are purified multi-wall nanotubes or purified single-wall nanotubes. In yet a further embodiment of the present disclosure, a combination of single and multiwall nanotubes may be deposited. As illustrated by FIG. 2, the deposition of the carbon nanotubes 20 results in the formation of a layered nanotube-substrate combination.

In a particular embodiment of the present disclosure, the layer of carbon nanotubes 20 is deposited onto the electrode substrate 10 by vacuum filtration. In an embodiment, the carbon nanotubes 20 are first suspended in water and then vacuum filtered through the porous carbon paper. The deposition of the carbon nanotubes 20 by vacuum filtration results in the formation of a porous three-dimensional layered composite structure 25. Moreover, vacuum filtration, advantageously provides for a controlled and homogeneous deposition of a carbon nanotube layer on substrate 10.

In accordance with the process for fabricating the electrochemical supercapacitor, a layer of a metal oxide material 30 is subsequently deposited onto the layer of carbon nanotubes 20 of composite structure 25. In an embodiment, the metal oxide material 30 comprises a particulate metal oxide material. In a particular embodiment of the present disclosure, a suitable metal oxide material comprises $RuO_2$, $TiO_2$, $MnO_2$, $NiO$, $Fe_3O_4$, $IrO_2$, $V_2O_5$ or combinations thereof. As illustrated by FIG. 3, the deposition of a layer of metal oxide material 30 onto the layer of carbon nanotubes 20 results in the formation of a layered electrode 40.

In a particular embodiment of the present disclosure, the layer of metal oxide material 30 is deposited onto composite structure 25 by vacuum filtration. In an embodiment, the particulate metal oxide material is first suspended in ethanol and then vacuum filtered through the porous composite structure 25 resulting in the deposition of a layer of metal oxide material 30 onto the layer of carbon nanotubes 20. Vacuum filtration advantageously provides for the controlled and homogeneous deposition of a metal oxide layer 30 onto the layer of carbon nanotubes 20 of composite structure 25.

In an embodiment of the present disclosure, the layered electrode 40 defines a porous structure. Both the layer of carbon nanotubes 20 and the layer of metal oxide material 30 are conducting layers and thus function as the active materials of electrode 40. The layered and porous design of electrode 40 advantageously increases the effective conductive surface area of the electrode, resulting in an increase of the storage capacity of the superconductor comprising such an electrode.

In accordance with the process for fabricating the electrochemical supercapacitor, a layer of an electrolytic material 50 is deposited onto the metal oxide layer 30 of electrode 40 (FIG. 4). In an embodiment of the present disclosure, the electrolytic material is an ion exchange material. In a particular embodiment of the present disclosure, a suitable ion exchange material comprises Nafion™. Further suitable ion exchange materials include CMX, Aciplex, Selemion, Flemion, FKS, FKB, CR61-CMP, PC 100 D, PC Acid 35 and TINED. In an embodiment, Nafion™ is advantageously used to produce the layer of electrolytic material 50. Following its deposition, the Nafion™ layer is acid treated and dried. The electrolytic material can be air dried using vacuum filtration. It will be appreciated by those skilled in the art that other drying techniques may be used. In a particular embodiment of the present disclosure, the layer of electrolytic material 50 is treated with an aqueous sulfuric acid solution.

In an embodiment of the present disclosure, the electrolytic material forms a discrete layer 50 covering the surface of electrode 40 (i.e. covering the metal oxide layer 30 of electrode 40). In a further embodiment of the present specification, a portion of the deposited electrolytic material may flow through the pores of the previously deposited metal oxide and carbon nanotube layers so as to at least partially contact the layer of carbon nanotubes 20. However, even though such interlayer diffusion may occur due to the porosity of the layers making up the electrode 40, it does not occur to such an extent having an impact on the "distinctness" of the individual layers.

It will be appreciated from the above-description that the layers making-up electrode 40 and the layer of electrolytic material 50 are deposited separately such that an electrode comprising distinct layers is obtained.

In accordance with the process for fabricating the electrochemical supercapacitor, a first electrode 40 and a second electrode 40' are fabricated. In an embodiment of the present disclosure, the first electrode 40 and the second electrode 40' are of similar construction. Such an embodiment provides for the manufacture of a symmetrical electrochemical supercapacitor. Alternatively, in embodiments wherein the first electrode 40 and the second electrode 40' are of different construction, an asymmetric electrochemical supercapacitor can be produced. In a particular embodiment of the present disclosure, the electrodes 40 and 40' may comprise different metal oxide layers 30 (i.e. composed of a different metal oxide). In yet a further particular embodiment of the present disclosure, the electrodes 40 and 40' may comprise different carbon nanotube 20 layers (i.e. composed of a different type of carbon material).

In accordance with the process for fabricating the electrochemical supercapacitor, a suitable solid electrolyte membrane 60 is provided. In an embodiment of the present disclosure, the electrolyte membrane is a polymeric material having ionic properties. In a particular embodiment of the present disclosure, the electrolyte membrane is an ion exchange membrane. In a further particular embodiment of the present disclosure, a suitable solid electrolyte membrane comprises Nafion™/$H_2SO_4$. In yet a further particular embodiment of the present disclosure, a suitable solid electrolyte membrane comprises CMX/$K_2SO_4$.

In accordance with the process for fabricating the electrochemical supercapacitor, the solid electrolyte membrane 60 is positioned (i.e. sandwiched) between the electrodes 40 and 40'. The first electrode 40 is positioned such that the layer of electrolytic material 50 is disposed between the first electrode 40 and a first face of the solid electrolyte membrane 60. Similarly, the second electrode 40' is positioned such that the layer of electrolytic material 50' is disposed between the second electrode 50 and a second face of the solid electrolyte membrane 60. The first and second electrodes are then joined to the respective faces of the solid electrolyte membrane 60 to provide the layered electrochemical supercapacitor 100 illustrated in FIG. 5. In an embodiment of the present disclosure, the electrodes 40 and 40' are pressed to the solid electrolyte membrane 60. In a particular embodiment of the present disclosure, the electrodes 40 and 40' and the solid electrolyte membrane 60 are positioned in a plastic bag and subsequently pressed between two plastic foils.

Referring to FIG. 5, an elevated sectional view of an exemplary solid electrochemical supercapacitor 100 fabricated in accordance with the various processes of the present disclosure is illustrated. The solid electrochemical supercapacitor 100 is composed of a first electrode 40 comprising a metal oxide layer 30, a carbon nanotube layer 20 and a substrate 10 and a second electrode 40' comprising a metal oxide layer 30', a carbon nanotube layer 20' and a substrate 10'. Disposed between electrodes 40 and 40' is a solid electrolyte 70 composed of layers of electrolytic material 50 and 50' and solid electrolyte membrane 60. In an embodiment of the present disclosure, the layers of electrolytic material 50 and 50' are of a different composition (i.e. composed of a different type of electrolytic material). In a further embodiment of the present disclosure, the layers of electrolytic material 50 and 50' are of a similar composition. In a particular embodiment of the present disclosure, the layers of electrolytic material 50 and 50' are composed of Nafion™. The solid electrolyte 70 functions as both electrolyte and as an electronic insulator (but ionic conductor) between the first electrode 40 and the second electrode 40'. It will be appreciated that nanotube layers 20 and 20' and metal oxide layers 30 and 30' may be of similar or different construction. For instance, different metal oxides may be used for layers 30 and 30'. Similarly, different carbon nanotubes may be used for layers 20 and 20'.

Electrochemical supercapacitors based on solid electrolytes are usually characterized by a modest storage capacity because of an inadequate impregnation of the active electrode materials. The use of electrolytic materials such as disclosed in the present disclosure allows for maximizing the use of the electrochemically active surface area of the electrode materials by taking advantage of the porosity through interlayer diffusion.

In an embodiment of the present disclosure, a portion of the deposited electrolytic material flows through the pores of the previously deposited metal oxide and carbon nanotube layers so as to improve the contact with the layer of metal oxide material and to at least partially contact the layer of carbon nanotubes. This diffusion effectively increases the contact area between the electrolytic material and the active materials of the electrode (i.e. the metal oxide and carbon nanotube layers). Moreover, the diffusion also improves the contact between the electrodes and the solid electrolytic membrane. As a result of the improved contact between the electrolytic material and the active materials composing the electrodes, the electrical interaction between these materials is increased. Moreover, as a result of the improved electrical contact, the storage capacity of the electrochemical supercapacitor is also enhanced. Furthermore, the amount of active materials that can be deposited on the electrode 40 and that contributes to the electrical performance of the supercapacitor 100 can also be increased.

EXPERIMENTAL

A number of non-limiting experimental protocols are provided herein below illustrating the preparation of a solid electrochemical supercapacitor. These protocols are illustrative of the present specification.

Preparation of a Membrane Electrolyte

Nafion 117 membrane obtained from DuPont was utilized in the experiments as the electrolyte separator between the electrodes. The membrane was purified in 3 wt % hydrogen peroxide over a period of about 1 h at 70° C. to remove any organic impurities. The membrane was then treated in an aqueous sulfuric acid solution (1M) at 70° C.

Treatment of Carbon Paper

Carbon paper CP (Spectracarb™) was immersed in a bath of concentrated sulfuric acid over a period of about 4 h at 70° C. The carbon paper was then washed repeatedly with distilled water. The resulting material was dried at 105° C. overnight.

Synthesis of $RuO_2$ $RuCl_3 \cdot nH_2O$ and ethanol were stirred over a period of about 2 h. An aqueous solution of KOH (0.1M) was then dropped into the mixture while stirring until the pH of the solution reached 7. The black reaction product was subsequently filtered and washed repeatedly with distilled water. The resulting product was dried at 105° C.

Electrode Preparation

Purified (>90%) CNTs (Multiwall, O.D.×I.D.×length 10-15 nm×2-6 nm×0.1-10 μm) prepared by chemical vapor deposition (CVD) were purchased from Aldrich.

The CNTs (10 mg) were dispersed in distilled water using ultrasonication (FS 30, Fischer Scientific) over a period of about 2 h, without any surfactant. $RuO_2$ (20 mg) was suspended and stirred in ethanol over a period of 1 h.

The dispersed CNTs were filtered through the treated CP to form a three dimensional layered network of CP-CNTs. $RuO_2$ was subsequently filtered across the layered CP-CNTs. A few drops of liquid Nafion™ were then added to the CP-CNT-$RuO_2$ structure followed by the addition of a few drops of an aqueous $H_2SO_4$ solution (1M). Finally the sample was air dried using vacuum filtration. The same procedure was applied to the manufacture of a second electrode.

Assembly of the Cell

A solid electrochemical supercapacitor was fabricated using a sandwich configuration. A solid Nafion™ membrane was positioned between a pair of electrodes. The cell was subsequently placed in a plastic bag and pressed using a pair of plastic foils. The surface area for each CP-CNT-$RuO_2$ electrode measured to be 9.62 cm² and the mass loading was 20 mg of $RuO_2$.

It was discovered that the solid electrochemical supercapacitors of the present specification provide for increases in storage capacity. In accordance with an embodiment of the present specification, the average specific capacitance was measured to be 570 F/g. Moreover, the solid electrochemical supercapacitors of the present specification displayed considerable stability, with the capacitance remaining stable for up to 10000 charge/discharge cycles. Table 1 provides a comparison of the composition, physical characteristics such as storage capacity and stability in view of charge/discharge cycles of a supercapacitor in accordance with an embodiment of the present disclosure with the solid state electrochemical capacitors of the prior art.

TABLE 1

Comparison with various solid state electrochemical capacitors of the prior art.

| Electrode material | Electrolyte | C (F/g) | Stability (number of charge/discharge cycles) | Cell Voltage (V) |
|---|---|---|---|---|
| MWNTs/$RuO_2$ | Nafion membrane | 570 | 10000 | 1 |
| $TiO_2$/MWNT and Polypyrrole/MWNT | Nafion membrane | 345 | | 1 |
| Polyaniline/MWNTs and $TiO_2$/MWNTs | Nafion membrane | 240 | | 3 |
| $MnO_2$ | PAAK-based aqueous gel electrolyte containing KCl | 168 | | |
| Polypyrrole | Polymeric gel electrolytes polyvinylidene fluoride co-hexafluoropropylene (PVdF-HFP)-ethylene carbonate (EC)-propylene carbonate (PC)—$MClO_4$: M=Li, Na, $(C_2H_5)_4N$ | 78-137 | 5000 | 1 |
| Polypyrrole | Polymethyl methacrylate (PMMA)-propylene carbonate (PC)-ethylene carbonate (EC)-perchlorate salts of different cations [Li+, Na+ and $(C_2H_5)_4N+$ (TEA+)] | 120-178 | 5000 | 1 |
| Commercial carbon | Ionic liquid + gel polymer electrolyte | | 4 | 6 |
| Nano structured carbon black | Poly(ethylene oxide)/poly(propylene glycol)-b-poly(ethylene glycol)-poly(propylene glycol)-bis(2-aminopropyl ether) blend (PEO-NPPP) and $LiClO_4$ | 17 | — | 2.5 |
| Carbon | Polymer electrolyte Sulfonated poly (ether ether ketone), S-PEEK | 161 | — | 0.9 |
| Activated carbon cloth | A gel electrolyte poly(ethylene oxide) crosslinked with poly(propylene oxide) as a host, propylene carbonate (PC) as a plasticizer, and $LiClO_4$ as a electrolytic | 86 | — | 5 |
| Carbon aerogel | Alkaline polymer gel KOH-based gel polymer | 9 | — | 1 |
| Activated carbon | Gel Polymer Poly[(ethylene glycol)diacrylate]-poly(vinylidene fluoride), a gel polymer blend with ethylene carbonate:dimethyl carbonate:ethylmethyl carbonate (EC:DMC:EMC, 1:1:1 volume ratio) and containing 1.0M of lithium hexafluorophosphate ($LiPF_6$) as liquid components | 125 | — | 2.5 |

TABLE 1-continued

Comparison with various solid state electrochemical capacitors of the prior art.

| Electrode material | Electrolyte | C (F/g) | Stability (number of charge/discharge cycles) | Cell Voltage (V) |
|---|---|---|---|---|
| Activated carbon fiber (ACF | Non-aqueous polymeric gel poly(ethylene oxide)-modified polymethacrylate (PEO-PMA) dissolving anhydrous $H_3PO_4$ with organic plasticizer | 200 | | 0.8 |
| Activated Carbon | Solid electrolyte $H_3PO_4$-doped silica gel and styrene-ethylene-butylene-styrene elastomer | 10 | | 0.8 |
| Activated Carbon | Polyvinyl alcohol-containing silica gels doped with $HClO_4$ | 44 | | 1 |
| Activated carbon fiber | Gel Polymer Polyvinylpyrrolidone (PVP) and PVP-polyvinylacetate (PVP-PVAc) as base polymers, $(C_2H_5)_4NBF_4$ as an electrolyte salt and propylene carbonate (PC) as a plasticizer | 38 | | 1 |

While the above description provides examples of the embodiments, it will be appreciated that some features and/or functions of the described embodiments are susceptible to modification without departing from the spirit and principles of operation of the described embodiments. Accordingly, what has been described above has been intended to be illustrative and non-limiting and it will be understood by persons skilled in the art that other variants and modifications may be made without departing from the spirit and scope of the appended claims.

The invention claimed is:

1. A process for fabricating an electrochemical supercapacitor, the process comprising:
   depositing a carbon nanotube layer onto a substrate;
   depositing a layer of metal oxide material onto the carbon nanotube layer forming a first electrode;
   depositing an electrolytic material onto the first electrode; and
   joining the first electrode to a first face of a solid electrolyte membrane such that the electrolytic material is disposed between the first electrode and the electrolytic membrane;
   wherein the carbon nanotubes, the metal oxide and the electrolytic material comprise distinct layers and wherein the carbon nanotubes and metal oxide material are deposited by vacuum filtration.

2. The process of claim 1, wherein the substrate is carbon paper, the electrolytic material is an ion exchange material, and the electrolyte membrane is an ion exchange material.

3. The process of claim 1, further comprising:
   depositing a carbon nanotube layer onto a second substrate;
   depositing a layer of metal oxide material onto the carbon nanotube layer forming a second electrode;
   depositing an electrolytic material onto the second electrode; and
   joining the second electrode to a second face of the solid electrolyte membrane such that the electrolytic material is disposed between the second electrode and the electrolytic membrane;
   wherein the carbon nanotubes, the metal oxide and the electrolytic material comprise distinct layers and wherein the carbon nanotubes and metal oxide material are deposited by vacuum filtration.

4. The process of claim 3, wherein the layers of electrolytic material and the electrolyte membrane form a solid electrolyte.

5. The process of claim 4, wherein the electrolytic layers are treated with acid.

6. The process of claim 3, wherein the carbon nanotubes are selected from single, double and multi-walled carbon nanotubes.

7. The process of claim 3, wherein the metal oxide is selected from $RuO_2$, $TiO_2$, $MnO_2$, $NiO$, $Fe_3O_4$, $IrO_2$ and $V_2O_5$ or combinations thereof.

8. A process for fabricating an electrochemical supercapacitor, the process comprising:
   depositing a carbon nanotube layer onto a substrate;
   depositing a layer of metal oxide material onto the carbon nanotube layer forming a first electrode;
   depositing an electrolytic material onto the first electrode; and
   joining the first electrode to a first face of a solid electrolyte membrane such that the electrolytic material is disposed between the first electrode and the electrolytic membrane;
   wherein the carbon nanotubes and the metal oxide layers are deposited by vacuum filtration.

9. The process of claim 8, wherein the substrate is carbon paper, the electrolytic material is an ion exchange material, and the electrolyte membrane is an ion exchange material.

10. The process of claim 8, further comprising:
    depositing a carbon nanotube layer onto a second substrate;
    depositing a layer of metal oxide material onto the carbon nanotube layer forming a second electrode;
    depositing an electrolytic material onto the second electrode; and
    joining the second electrode to a second face of the solid electrolyte membrane such that the electrolytic material is disposed between the second electrode and the electrolytic membrane;
    wherein the carbon nanotubes and the metal oxide layers are deposited by vacuum filtration.

11. The process of claim 10, wherein the layers of electrolytic material and the electrolyte membrane form a solid electrolyte.

12. The process of claim 11, wherein the electrolytic layers are treated with acid.

13. The process of claim 10, wherein the carbon nanotubes are selected from single, double and multi-walled carbon nanotubes.

14. The process of claim 10, wherein the metal oxide is selected from $RuO_2$, $TiO_2$, $MnO_2$, NiO, $Fe_3O_4$, $IrO_2$ and $V_2O_5$ or combinations thereof.

* * * * *